(12) United States Patent
Thompson

(10) Patent No.: US 6,884,080 B2
(45) Date of Patent: Apr. 26, 2005

(54) TAXIDERMY FORM AND METHOD

(75) Inventor: James Matthew Thompson, Hampton, GA (US)

(73) Assignee: Matt Thompson Taxidermy & Supply, Inc., Lovejoy, GA (US)

( * ) Notice: Subject to any disclaimer, the term of this patent is extended or adjusted under 35 U.S.C. 154(b) by 0 days.

(21) Appl. No.: 10/170,085

(22) Filed: Jun. 11, 2002

(65) Prior Publication Data

US 2003/0228562 A1 Dec. 11, 2003

(51) Int. Cl.[7] .......................... G09B 23/00; G09B 23/36
(52) U.S. Cl. ........................ 434/295; 434/296; 428/16; 428/542.4
(58) Field of Search ................... 434/295, 296; 428/16, 542.4; 452/125; 69/22

(56) References Cited

U.S. PATENT DOCUMENTS

| | | | | |
|---|---|---|---|---|
| 1,895,729 A | * | 1/1933 | Pflueger | 434/296 |
| 1,918,929 A | * | 7/1933 | Pflueger | 434/296 |
| 2,831,271 A | * | 4/1958 | Stitt | 434/296 |
| 3,557,436 A | * | 1/1971 | Hodes | 29/428 |
| 3,994,077 A | * | 11/1976 | Touchstone | 434/296 |
| 4,432,919 A | | 2/1984 | Rinehart | |
| 4,464,440 A | | 8/1984 | Dotzman | |
| 4,477,500 A | | 10/1984 | Powell | |
| 4,515,340 A | | 5/1985 | Rinehart | |
| 4,753,412 A | | 6/1988 | Johnson | |
| 4,775,323 A | | 10/1988 | Johnson | |
| 5,015,532 A | | 5/1991 | Knight | |
| 5,540,592 A | * | 7/1996 | Scheinberg et al. | 434/265 |
| 5,567,161 A | * | 10/1996 | Kallina | 434/295 |
| 5,645,780 A | | 7/1997 | Rinehart | |
| 6,007,881 A | | 12/1999 | Lennard | |
| 6,109,921 A | * | 8/2000 | Yau | 434/100 |

OTHER PUBLICATIONS

John H. Peterson& Bren Southerland "Bring'em back Alive—Sort of The Facts on Airbrushing Taxidermy" copyright 2001.*

* cited by examiner

*Primary Examiner*—Derris H. Banks
*Assistant Examiner*—Dmitry Suhol
(74) *Attorney, Agent, or Firm*—David L. Nocilly; Bond, Schoeneck & King, PLLC

(57) ABSTRACT

The invention involves a taxidermy form comprising opposing face pieces having eye openings and nostrils which overlay an inner core having eye sockets, eyeballs, nasal cavities, and a nostril septum to form realistic eye settings and noses. The core is molded as a single unit with eye sockets, a nasal cavity, and a septum and the desired style eyeballs are adhered to the eye sockets and the nasal cavity are detailed and painted to replicate those of a living animal of the type to be mounted. Once the core is prepared, the outer face pieces are attached in an overlying relationship to expose a portion of the eyeballs through the eye openings and the underlying nostril cavities and septum through the nostrils, thereby creating a more realistic taxidermy mount which is easy to prepare. In an alternative embodiment, the two face pieces can be molded as a single unit, which can be easily slipped over the nose of the core and affixed in place in the same manner as the separate pieces.

9 Claims, 5 Drawing Sheets

TAXIDERMY FORM AND METHOD

BACKGROUND OF THE INVENTION

1. Field of Invention

The present invention relates generally to taxidermy and, more particularly, to a taxidermy form and method.

2. Description of Prior Art

Taxidermy typically involves the preservation of animal hides and mounting them onto forms which replicate the sub-dermal structures of the animal to be preserved. Conventional taxidermy forms are molded in one piece which is then prepared to display the particular mount. One piece forms, however, often lack detail in particular facial features due to the difficulties in molding eyes, eyelids, noses, nostrils, and septa. Some prior art forms attempt to remedy these shortcomings by providing receptacles for separate eye pieces or the like which can be glued into a preformed socket.

Prior art forms often require the use of additional parts which must be further attached to the form to give the final mount more realistic detail in the eye and nose areas. For example, glass eyes may be set into the form and clay added to recreate the proper eyelid and muscle definition. Other forms use preformed eye capsules which still must be adhered to the form. Shaping these features is time consuming, tough to master, and the additional pieces can become displaced when the animal skin is stretched over the form.

Conventional taxidermy forms are also difficult to detail. Typically, a taxidermist must apply detail paint to areas such as the nostril and septum through the smaller-sized, preformed nostrils. Additionally, an entirely new taxidermy head must be cast for each mount, depending on the size of the head of the particular animal to be displayed.

3. Objects and Advantages

It is a principal object and advantage of the present invention to provide a taxidermy form which results in more realistic facial features.

It is an additional object and advantage of the present invention to provide a taxidermy form which is easier to prepare than state of the art forms.

It is a further object and advantage of the present invention to provide a taxidermy form which can be used with different sized animals.

Other objects and advantages of the present invention will in part be obvious, and in part appear hereinafter.

SUMMARY OF THE INVENTION

In accordance with the foregoing objects and advantages, the present invention provides a taxidermy form with realistic facial features which is easy to prepare and can be used with a variety of differently sized animals. The form comprises a center core having preformed nostril cavities, a nostril septum, and eye sockets to which artificial eyeballs may be attached. The taxidermy form further comprises two preformed face pieces having outer surface detail as well as nostrils and eye openings formed therethrough. When the face pieces are attached to the center core in an overlying relationship, the eyeballs extend partially through the eye openings and the nostril cavities, and the septum is visible through the nostrils. Alternatively, the two face pieces may be pre-formed as a single unit which is then affixed in covering relation to the center core.

DETAILED DESCRIPTION

Figure 1:
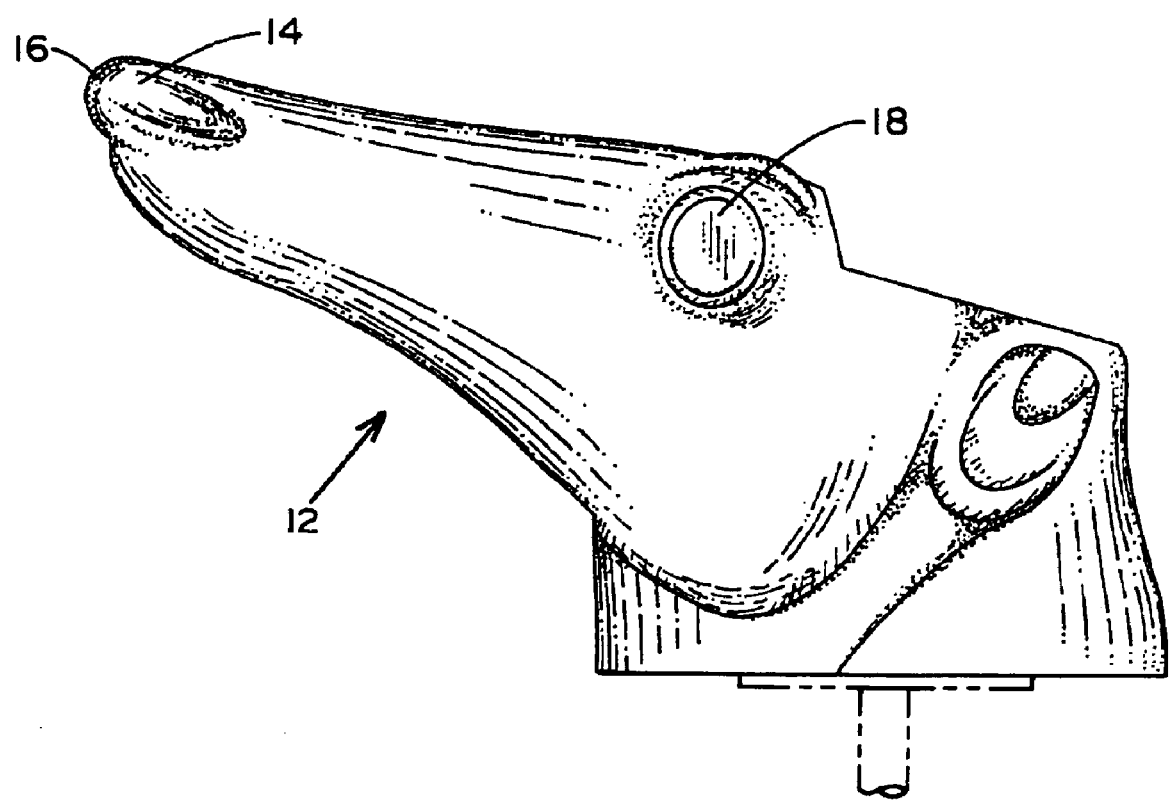
FIG. 1 is a side elevation view of the center core of the present invention.
Figure 2:
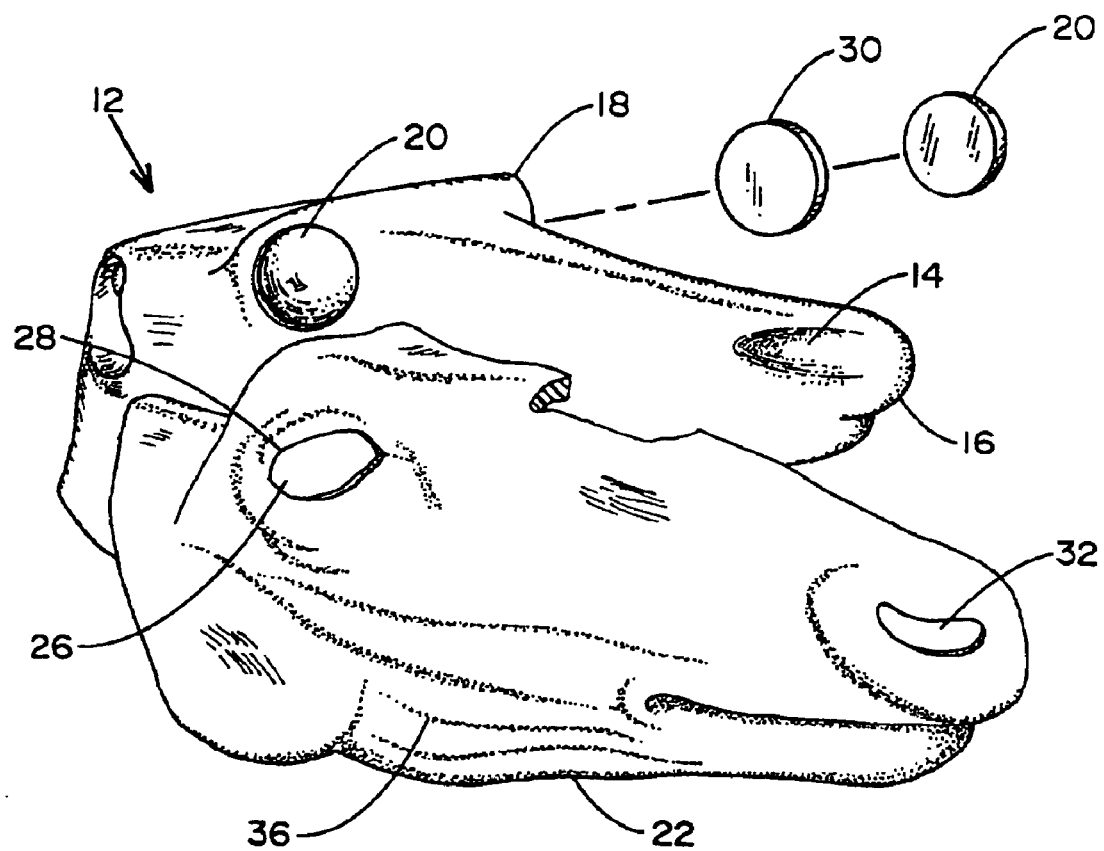
FIG. 2 is a first exploded perspective view of the present invention before final assembly.

Referring now to the drawings, in which like reference numerals refer to like parts throughout, there is seen in FIG. 1 a center core 12 of the present invention having a pair of nostril cavities 14, a nostril septum 16 which separates cavities 14, and a pair of anatomically correct eye sockets 18. Center core 12 may be formed by conventional molding processes from ordinary moldable substances, such as urethane foam. Nostril cavities 14, nostril septum 16, and eye sockets 18 are preformed into center core 12 during the molding process. As seen in FIG. 2, artificial eyeballs 20 are adhered to eye sockets 18 via a layer of an adhesive substance 30.

Figure 3:
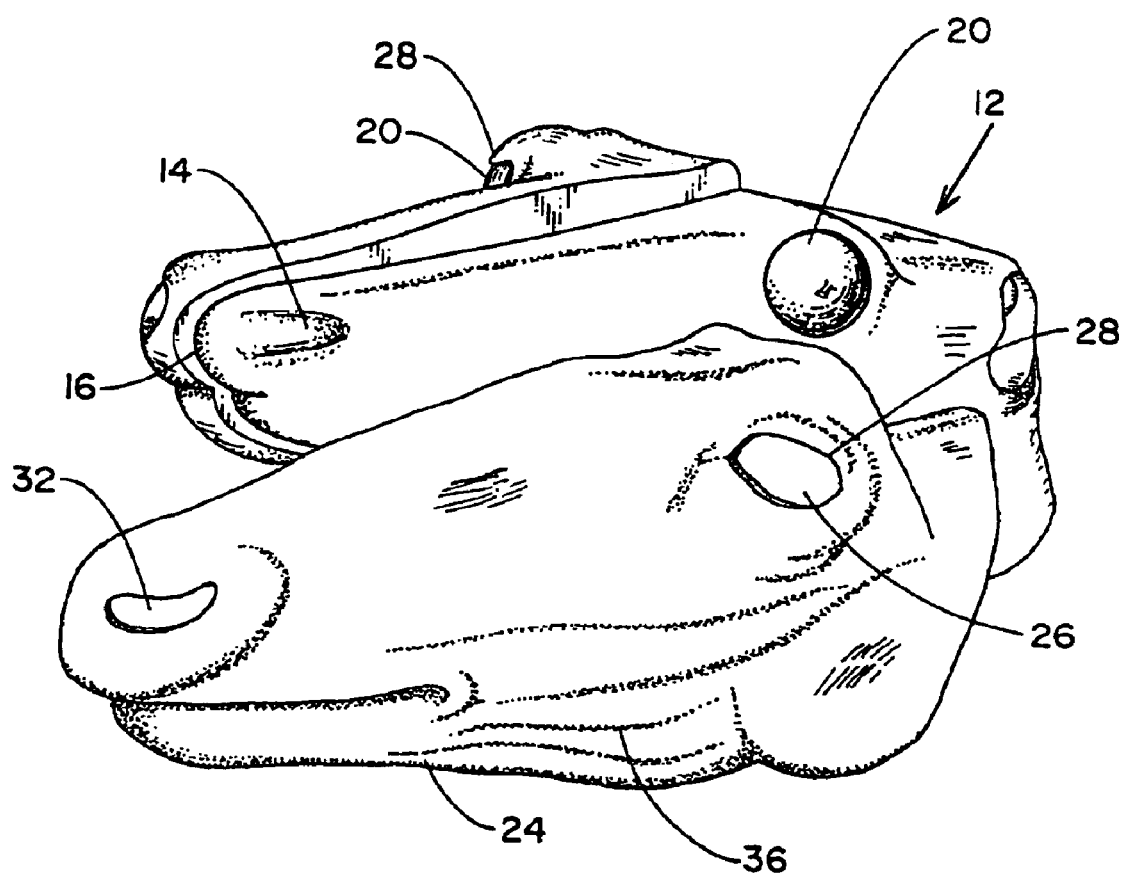
FIG. 3 is a second exploded perspective view of the present invention before final assembly.

As seen in FIGS. 2 and 3, the present invention further comprises left and right face pieces 22 and 24, respectively, which are molded independently from common mold compounds, such as urethane foam, and are adapted for attachment to center core 12 in a covering relationship. The outer surfaces of face pieces 22 and 24 have sculpting 36 to reproduce the muscular structure and facial features of the particular animal species to be preserved, while the inner surface is smooth to facilitate secure adherence to core 12.

Face pieces 22 and 24 further comprise a pair of eye openings 26 and a pair of nostrils 32 formed therethrough. The outer edges of eye openings 26 are molded to simulate eyelids 28 and are positioned to allow eyeballs 20 to extend partially therethrough when face pieces 22 and 24 are adhered to core 12. Nostrils 32 partially expose the underlying nostril cavities 14 and nostril septum 16.

Figure 4:
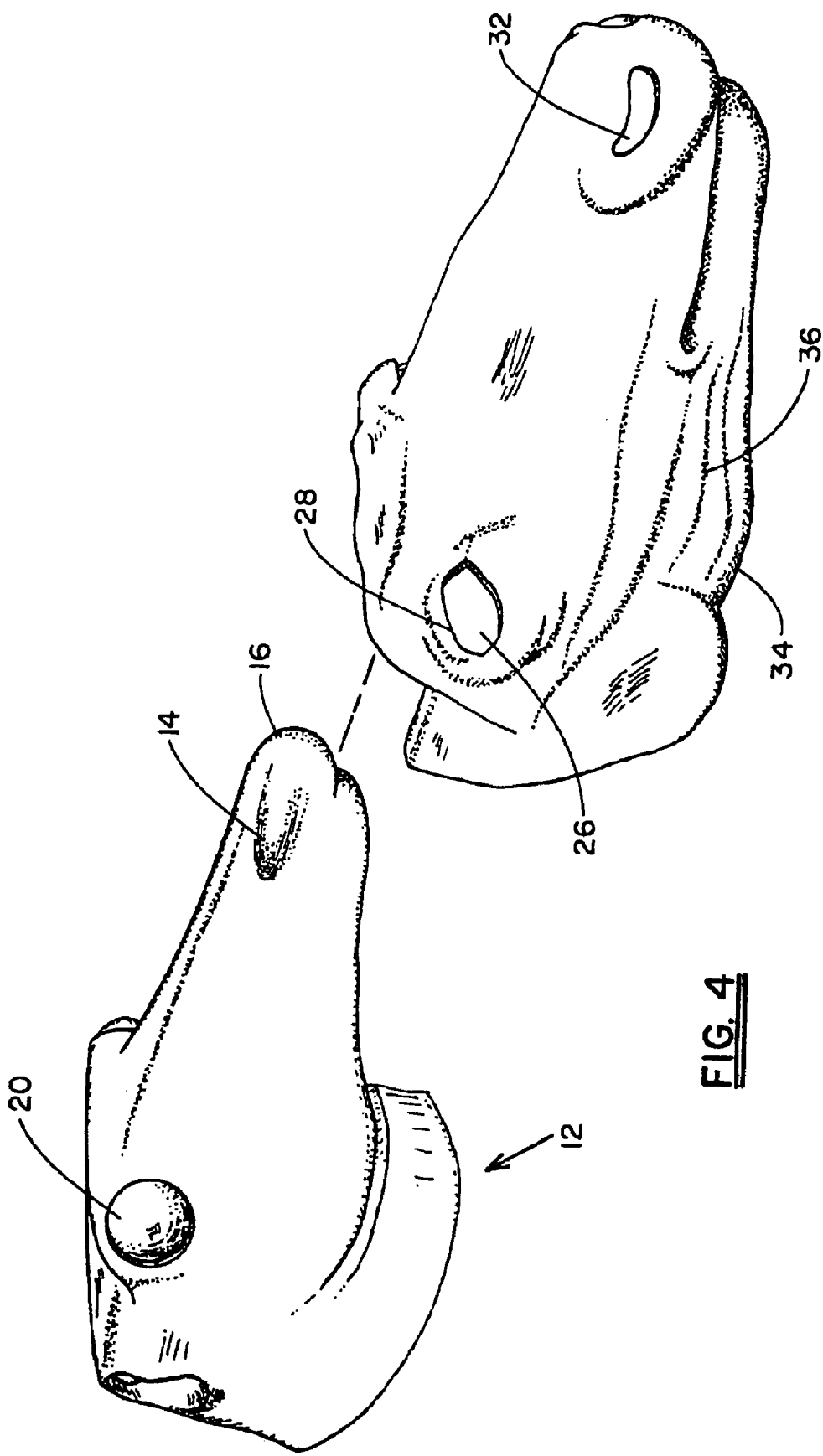
FIG. 4 is an exploded perspective view of an alternate embodiment of the present invention.

As illustrated in FIG. 4, faces pieces 22 and 24 (not shown in FIG. 4) may be molded as a single unit 34 having an inner cavity that contours the outer surface of core 12. Single unit 34 is installed by sliding the inner cavity over nostril septum 16 and affixing unit 32 to core 12 in the same manner as separate face pieces 22 and 24. While the shape and dimensions of the inner surface of single unit 34 or the inner surface of separate face pieces 22 and 24 must contour and correspond with the shape and dimensions of the outer surface of core 12, the shape and dimensions of the outer surface of single unit 34 or separate face pieces 22 and 24 may be molded to represent various animal face sizes and shapes.

Figure 5:
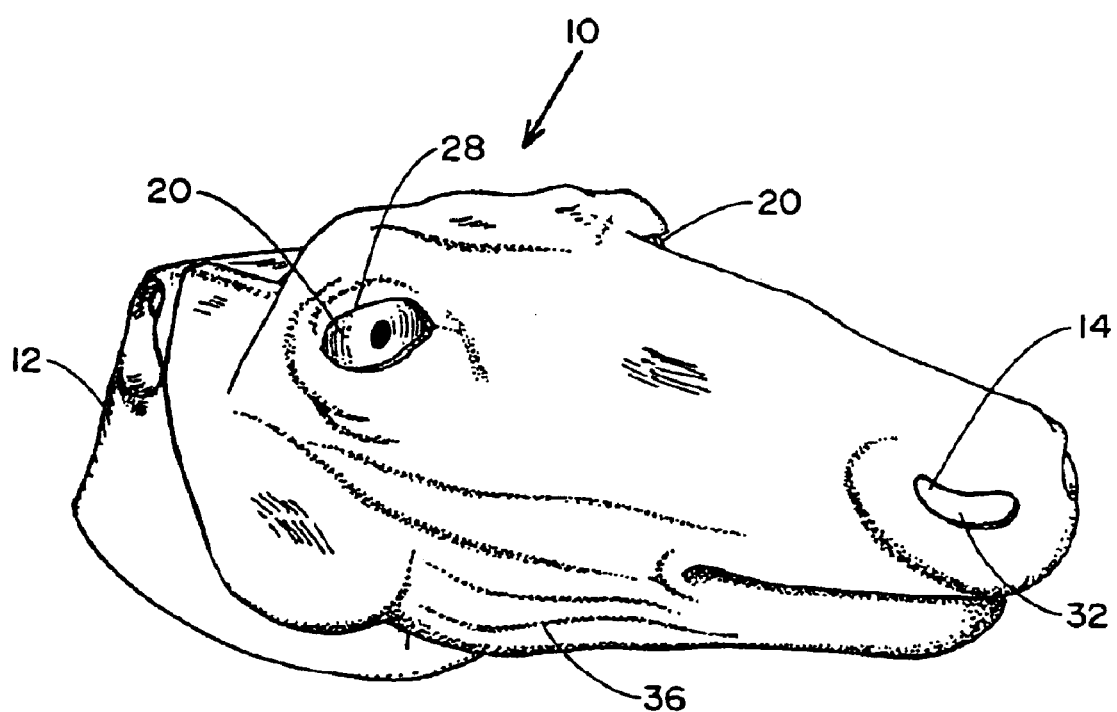
FIG. 5 is a perspective view of the alternate embodiment after final assembly.

Preparing the taxidermy form of the present invention comprises the steps of forming center core 12 and attaching eyeballs 20 to eye sockets 18 using adhesive 30 as the bonding agent. Nostril cavities 14 and nostril septum 16 may also be prepared by painting or other detailing as desired by the taxidermist. Once eyeballs 20 are set in sockets 18, a layer of adhesive is applied in covering relation to the surface of core 12 and face pieces 22 and 24 (or single face unit 34) are attached in a covering relation to core 12. Alternatively, eyeballs 20 may be first adhered to inner surface of face pieces 22 and 24 so that eyeballs 20 seat in eye sockets 18 when face pieces 22 and 24 are attached to core 12. As seen in FIG. 5, the taxidermy form 10 of the present invention is complete when face pieces 22 and 24 (or single face unit 34) are attached in covering relation to core 12, eyeballs 20 extend partially through eye openings 26, and nostrils 32 partially expose underlying nostril cavities 14.

Once form 10 is prepared, the skin (not shown) of the preserved animal may be positioned pursuant to traditional methods. The use of separate core 12 and face pieces 22 and 24 creates a pair of realistic, overlapping eyelids 28 which allow the animal skin to be tucked between eyeballs 20 and eyelids 28 for a natural eye set. Additionally, a taxidermist may detail the nostril cavity 14 and nostril septum 16 while they are entirely exposed prior to face pieces 22 and 24 being affixed to core 12.

What is claimed is:

1. A taxidermy form, comprising:
   a core;
   a face piece having an inner cavity and first and second eye openings formed therethrough, wherein said inner cavity is affixed in at least partially covering relation to said core;
   said face piece including molding representative of the sub-dermal structure of a particular animal; and
   wherein first and second eyeballs extend through said first and second eye openings, respectively.

2. A method of preparing a taxidermy form comprising a core having first and second eye sockets, first and second nostril cavities separated by a nostril septum, and first and second opposing face pieces having first and second eye openings, first and second nostrils, molding representative of the facial and muscular features of a particular animal, said method comprising the steps of:
   positioning artificial first and second eyeballs over said core in alignment with said first and second eye sockets of said first and second face pieces, respectively; and
   interconnecting said first and second face pieces in covering relation to said core such that said first and second eyeballs extend at least partially through said eye opening.

3. The method of claim 2, further comprising the step of painting said first and second nostril cavities prior to interconnecting said first and second face pieces.

4. The method of claim 2, wherein said first and second nostrils align with said first and second nostril cavities, respectively.

5. A method of preparing a taxidermy form comprising a core having first and second eye sockets, first and second nostril cavities separated by a nostril septum, and a face piece having first and second eye openings, first and second nostrils, molding representative of the facial and muscular features of a particular animal said method comprising the steps of:
   positioning artificial first and second eyeballs over said core in alignment with said eye sockets; and
   interconnecting said face piece in covering relationship to said core such that said first and second eyeballs extend at least partially through said first and second eye openings.

6. The method of claim 5, wherein said first and second nostrils align with said first and second nostril cavities, respectively.

7. A taxidermy form for mounting a preserved animal skin, comprising:
   a core having a substantially smooth surface and including first and second nostril cavities and first and second eye sockets molded therein;
   a face piece including an inner cavity having a substantially smooth surface, an outer surface having molding formed therein that reproduces the muscular structure and facial features of a particular animal species, and first and second eye opening formed therethrough, wherein said face piece is affixed in at least partially covering relation to said core; and
   first and second artificial eyeballs positioned between said core and said face piece such that said first and second eyeballs extend at least partially through said first and second eye openings, respectively.

8. The taxidermy form of claim 7, wherein said face piece further includes first and second nostrils.

9. The taxidermy form of claim 8, wherein said first and second nostrils of said face piece are in alignment with said first and second nostril cavities of said core, and said first and second eyeballs are positioned in said first and second eye sockets.

* * * * *